(12) United States Patent
Kim et al.

(10) Patent No.: US 9,911,353 B2
(45) Date of Patent: Mar. 6, 2018

(54) DYNAMIC CONTENT MANIPULATION ENGINE

(71) Applicant: Pearson Education, Inc., Upper Saddle River, NJ (US)

(72) Inventors: Brom Kim, Centennial, CO (US); James Krieg, Littleton, CO (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 242 days.

(21) Appl. No.: 14/621,190

(22) Filed: Feb. 12, 2015

(65) Prior Publication Data

US 2015/0228198 A1 Aug. 13, 2015

Related U.S. Application Data

(60) Provisional application No. 61/939,153, filed on Feb. 12, 2014.

(51) Int. Cl.
*G09B 7/00* (2006.01)
*G09B 7/07* (2006.01)

(52) U.S. Cl.
CPC ....... *G09B 7/00* (2013.01); *G09B 7/07* (2013.01)

(58) Field of Classification Search
CPC . G09B 7/00; G09B 7/07; G09B 7/073; G06Q 30/0203; G06F 12/08; G06F 12/0811
See application file for complete search history.

(56) References Cited

U.S. PATENT DOCUMENTS

| 2007/0042335 A1* | 2/2007 | Tidwell-Scheuring .. G09B 7/00 434/350 |
| 2013/0017530 A1* | 1/2013 | Nguyen ................. G06Q 10/10 434/362 |
| 2013/0231980 A1* | 9/2013 | Elgart ..................... G06Q 50/20 705/7.38 |

* cited by examiner

*Primary Examiner* — Peter Egloff
(74) *Attorney, Agent, or Firm* — Kilpatrick Townsend & Stockton LLP

(57) ABSTRACT

A content delivery system is disclosed herein. The content delivery system includes a content management server, a survey server, and a database server that are communicatingly connected with a plurality of user devices. The database server includes a plurality of databases that are organized in a tiered memory such that prioritized data is placed in memory tier having faster components and non-prioritized data is placed in a memory tier having relatively slower components. The content distribution system can generate an evaluation and evaluation data by identifying a cohort for receipt of the evaluation, compiling the evaluation, and receiving evaluation results.

20 Claims, 12 Drawing Sheets

DYNAMIC CONTENT MANIPULATION ENGINE

CROSS-REFERENCES TO RELATED APPLICATIONS

This application claims the benefit of U.S. Provisional Application No. 61/939,153, filed Feb. 12, 2014, and entitled "DYNAMIC CONTENT MANIPULATION ENGINE," the entirety of which is hereby incorporated by reference herein.

BACKGROUND

This disclosure relates in general to learning and can include traditional classroom learning or on-line or computerized learning including, but without limitation to learning or instruction with a Learning Management System (LMS) and/or Online Homework System (OHS).

Numerous resources can be used in facilitating student achievement of an education goal. These resources can include, but not by way of limitation, instructional resources such as an instructor or teacher, a lecture, a demonstration, or example problems, practice resources such as practice problems or assignments, evaluation resources including, for example, a quiz, a test, or the like, and remediation resources. The effectiveness of these resources significantly impacts the degree to which the student learns and masters subject matter.

BRIEF SUMMARY

One aspect of the present disclosure relates to methods and systems for generating an evaluation and/or evaluation data. This can includes methods of determining when to generate an evaluation, methods of selecting a section and/or cohort for receiving an evaluation, methods for managing received evaluation data, and systems for the same. The use of these methods and systems can increase the quality and quantity of evaluation data received and can improve the effectiveness and the efficiency of the data management of the same.

One aspect of the present disclosure relates to a method of generating an evaluation. The method includes retrieving student data from a user profile database, which student data uniquely identifies each of a group of students in a course, retrieving academic performance information from the user profile database, which academic performance information identifies the academic performance of the students in the course, retrieving learning information from the user profile database, which learning information identifies one or several learning styles for some of the students in the course, retrieving feedback performance information, which feedback performance information indicates the usefulness of surveys previously completed by the students in the course, and retrieving selection parameters, which selection parameters identify a criteria for inclusion of one of the students in the course in a survey group, and which survey group is selected to complete a survey. In some embodiments, the method includes comparing at least one of the student data, the academic performance information, the learning information, and the feedback performance information to the selection criteria, identifying the survey group based on the comparison of the at least one of the student data, the academic performance information, the learning information, and the feedback performance information to the selection criteria, and receiving survey data from the survey group.

In some embodiments, the method includes receiving course data from a content library database. In some embodiments, the method include generating the survey, which generation of the survey can include retrieving at least one question from a survey database, which survey database can include a plurality of questions and survey data received in response to the plurality of questions.

In some embodiments, the method can include determining if the survey data is for use in real-time analysis. In some embodiments, the method can include identifying a portion of the survey data for use in real-time analysis and storing the portion of the survey data for use in real-time analysis at a first level. In some embodiments, the method includes identifying a portion of the survey data that is not for use in real-time analysis and storing the portion of the survey data that is not for use in real-time analysis at a second level. In some embodiments, the first level includes first memory components and the second level includes second memory components, which first memory components are relatively faster than the second memory components.

In some embodiments the method includes analyzing the portion of the data for use in real-time analysis. In some embodiments the method includes recommending a change if an analysis recommendation is identified and not recommending a change if an analysis recommendation is not identified. In some embodiments, the method includes generating and providing a change report if a change is recommended and generating and providing an analysis report if a change is not recommended.

One aspect of the present disclosure relates to a system for generating evaluation data. The system includes a tiered memory having hardware forming a first tier and a second tier. In some embodiments, the second tier includes relatively slower hardware than the first tier. In some embodiments, the system includes a database stored in the tiered memory. The database can include a survey database having a first portion located on the first tier and a second portion located on the second tier, which first portion includes data received in response to a survey and which second portion includes data used in creating the survey. The database can include a user profile database including student data relating to a student's academic history, including student data relating to one or several learning styles, and student data relating to current enrollment. In some embodiments, the user profile database is located on the second tier. In some embodiments, the system can include a processor that can retrieve student data for a group of students from the profile database, which student data uniquely identifies each of a group of students in a course, retrieve academic performance information from the user profile database, which academic performance information identifies the academic performance of the students in the course, retrieve learning information from the user profile database, which learning information identifies one or several learning styles for some of the students in the course, retrieve feedback performance information, which feedback performance information indicates the usefulness of surveys previously completed by the students in the course, and retrieve selection parameters, which selection parameters identify a criteria for inclusion of one of the students in the course in a survey group, which survey group is selected to complete a survey. In some embodiments, the processor can compare at least one of the student data, the academic performance information, the learning information, and the feedback performance information to the selection criteria, identify the survey group based on the comparison of the at least one of the student data, the academic performance information, the learning information, and the feedback performance information to the selection criteria, and receive survey data from the survey group.

In some embodiments, the processor can receive course data from a content library database, and in some embodiments, the processor can generate the survey, which generating of the survey can include retrieving at least one question from the survey database. In some embodiments, the processor can determine if the survey data is for use in real-time analysis. In some embodiments, the processor can identify a portion of the survey data for use in real-time analysis and store the portion of the survey data for use in real-time analysis at the first tier. In some embodiments, the processor can identify a portion of the survey data that is not for use in real-time analysis and store the portion of the survey data that is not for use in real-time analysis at the second tier.

In some embodiments, the processor can analyze the portion of the data for use in real-time analysis. In some embodiments, the processor can recommend a change if an analysis recommendation is identified and not recommend a change if an analysis recommendation is not identified. In some embodiments, the processor can generate and provide a change report if a change is recommended and generate and provide an analysis report if a change is not recommended. Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
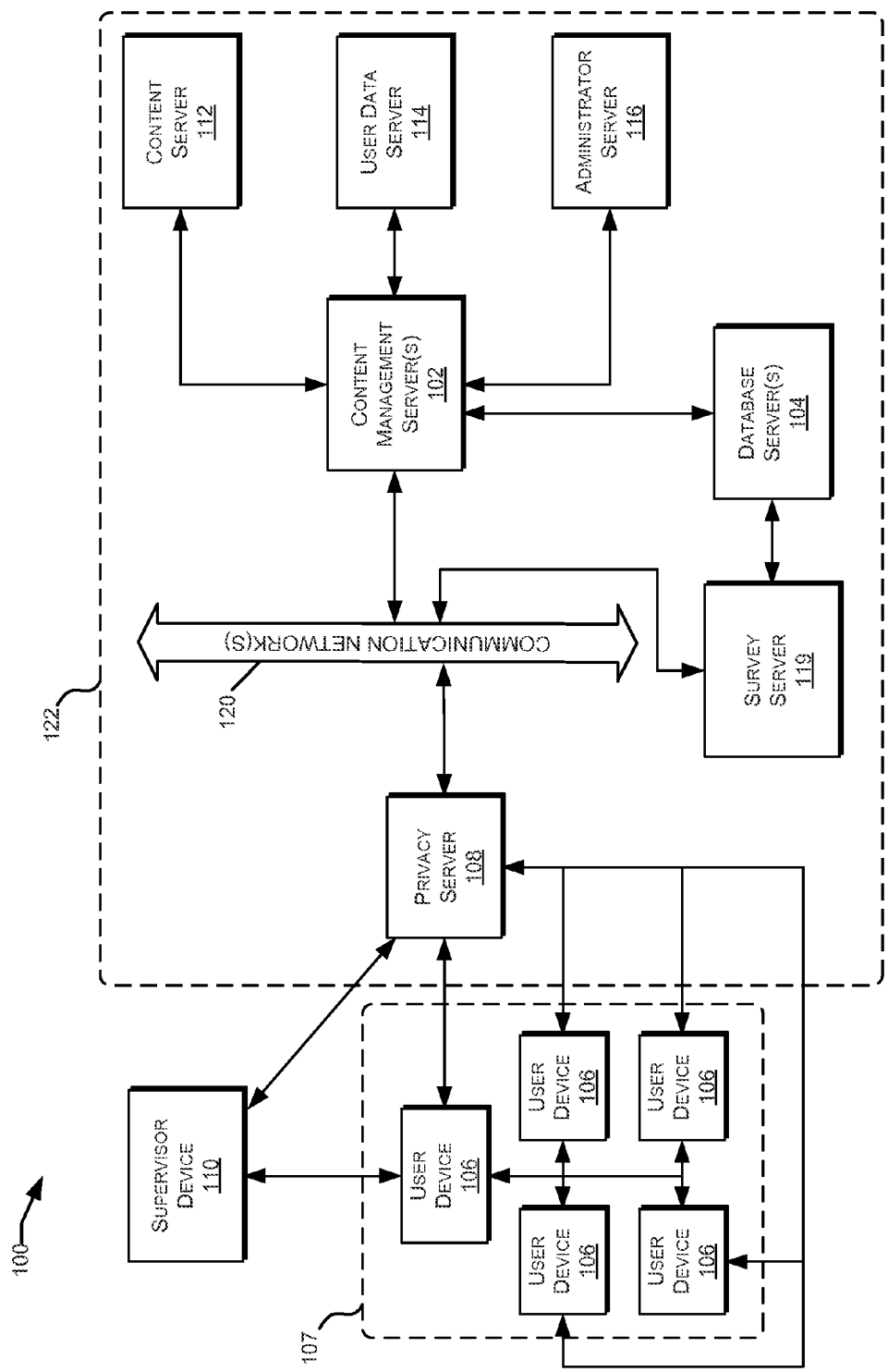
FIG. 1 is a block diagram showing illustrating an example of a content distribution network.

With reference now to FIG. 1, a block diagram is shown illustrating various components of a content distribution network 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more survey servers 119. The survey server 119 may include hardware and software components to generate, store, and maintain the survey resources for distribution to user devices 106 and other devices in the network 100. In some embodiments, the survey server 119 can send survey information to one or several of the user devices 106 and/or receive survey information from one or several of the user devices 106.

In some embodiments, the survey server 119 can be configured to generate and/or aggregate one or several surveys based on questions received from a user device 106 and/or a supervisor device 110. In some embodiments, the survey server 119 can be configured to generate and/or aggregate one or several surveys based on questions stored in a database in the database server 104.

In some embodiments, the survey server 119 can be configured to receive, sort, and/or analyze some or all of the survey information received from the one or several user devices 106. In some embodiments, the survey server 119 can receive the survey information, classify the survey information, and direct the storage of the survey information within one or several of the databases of the database server 104 according to one or several attributes of the survey information. In some embodiments, these one or several attributes can, for example, relate to whether the survey information is of the type used for providing real-time feedback, or of the type that is not used for providing real-time feedback.

By way of example, in some embodiments, survey information can be received during, for example, a lecture, a class, or the like, and can be used to affect a portion of that lecture, class, or the like. In such an embodiment, the survey information can be analyzed to determine the effectiveness of the lecture, the class, or the like and feedback can be provided during the lecture, class, or the like based on the analysis of the survey data. As used herein, feedback is provided in real-time if feedback is provided before the completion of the lecture, class, or the like from which survey data was collected upon which the feedback is based.

In such an embodiment in which real-time feedback is desired, the speed with which the survey data is accessible and analyzable can determine whether timely, real-time feedback can be provided. Thus, in some embodiments, such survey information for which timely, real-time feedback may be desired can be directed for storage in a database located in a tier 0 or tier 1 memory, and survey information for which real-time feedback is not desired may be directed for storage in a database located in a lower tier memory.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can be identified as being part of the back-end components 122. The back-end components 122 can include, for example, the content management server 102, the database server 1204, the privacy server 108, the content server 112, the user data server 114, the administrator server 116, and/or the communication network 120.

Figure 2:
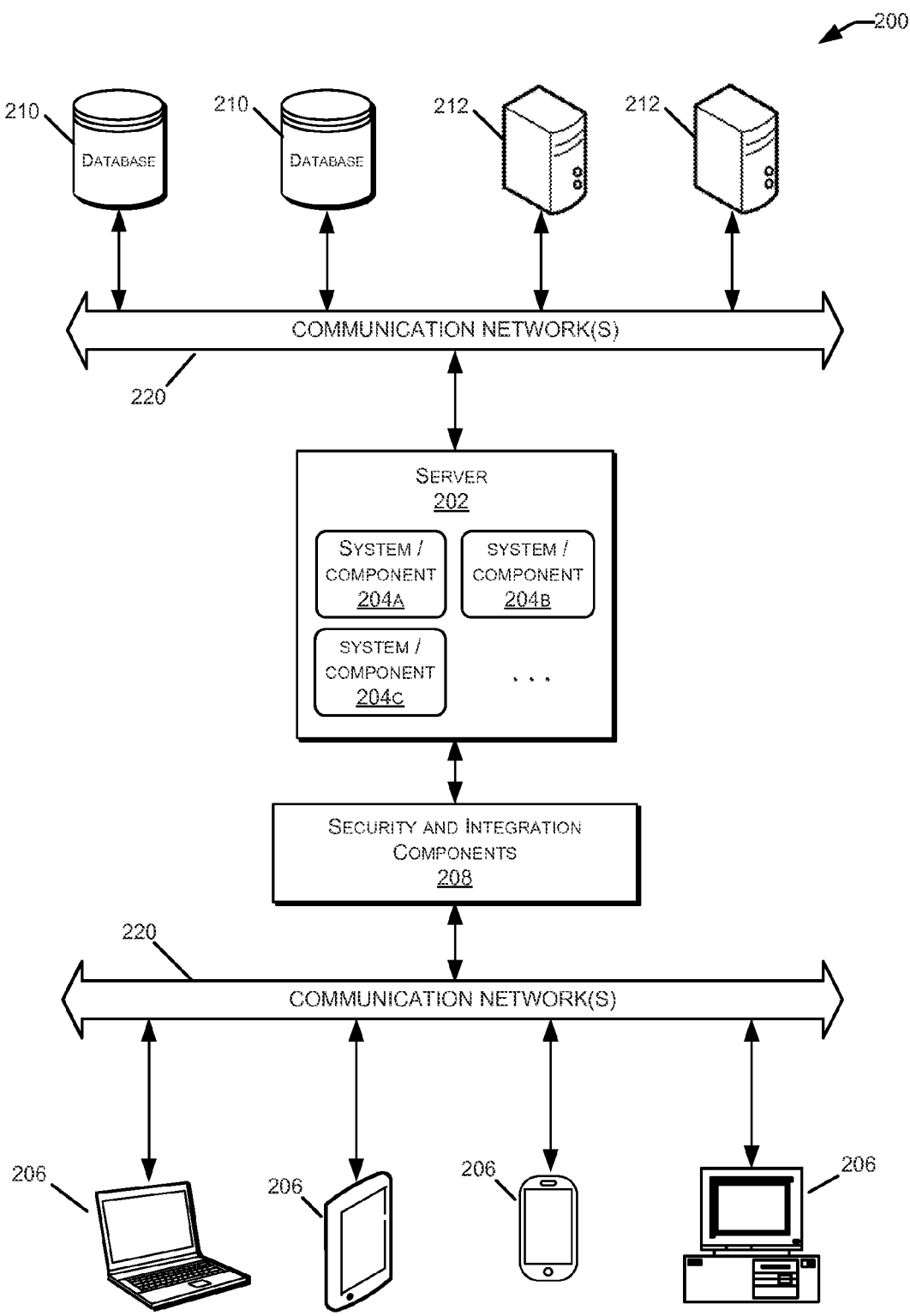
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN).

Figure 3:
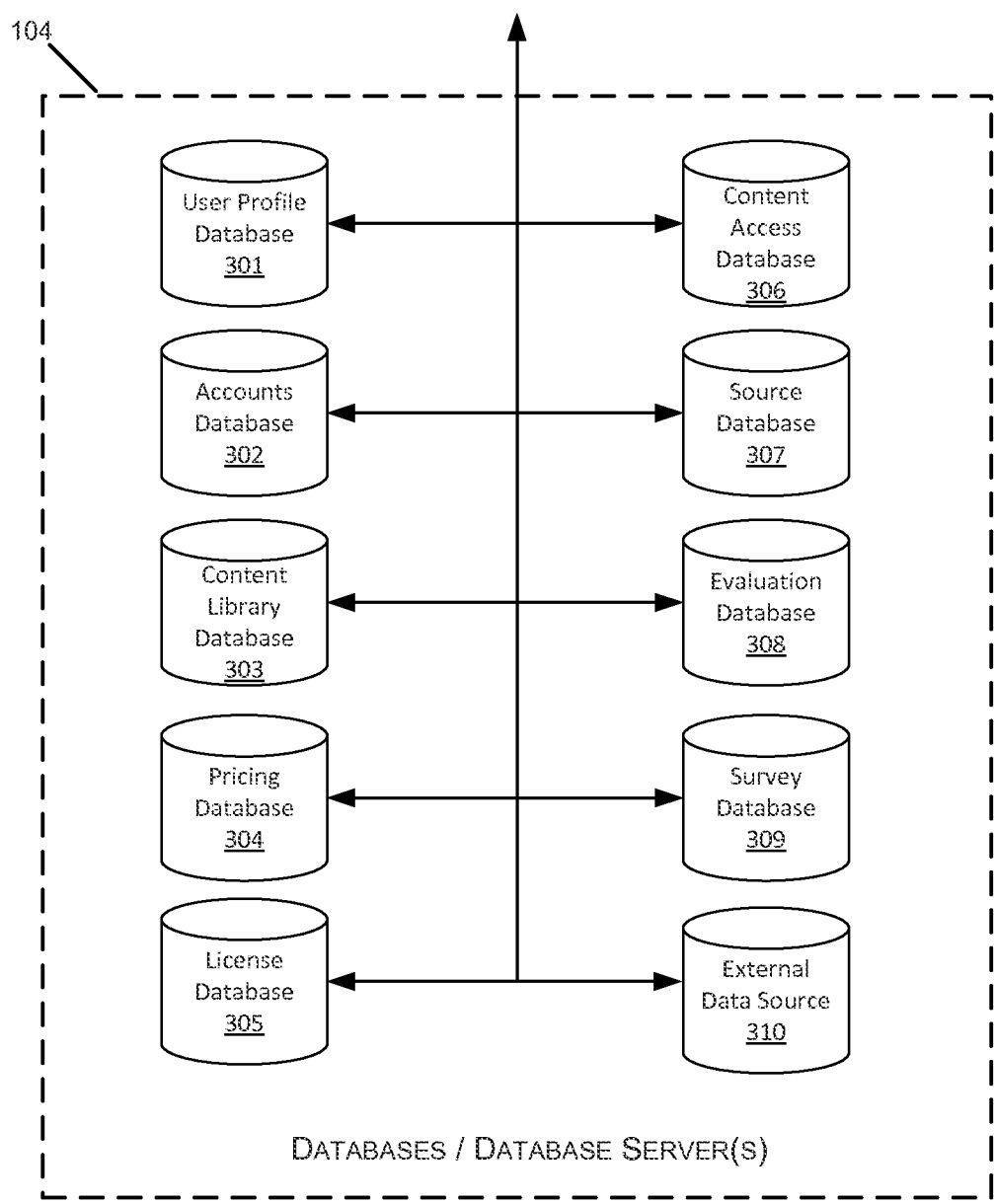
FIG. 3 is a block diagram illustrating an embodiment of one or more database servers within a content distribution network.

With reference to FIG. 3, an illustrative set of databases and/or database servers is shown, corresponding to the databases servers 104 of the content distribution network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content distribution network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

The user profile database 301 can further include information relating to a student's academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content distribution network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content distribution network 100.

An accounts database 302 may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content distribution network 100. In some embodiments, the library database 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources.

In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content distribution network 100.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source database 307 may include information relating to the source of the content resources available via the content distribution network. For example, a source database 307 may identify the authors and originating devices of content resources, previous pieces of data and/or groups of data originating from the same authors or originating devices, and the like.

An evaluation database 308 may include information used to direct the evaluation of users and content resources in the content management network 100. In some embodiments, the evaluation database 308 may contain, for example, the analysis criteria and the analysis guidelines for evaluating users (e.g., trainees/students, gaming users, media content consumers, etc.) and/or for evaluating the content resources in the network 100. The evaluation database 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation database 308 including data and/or instructions in the form of one or several electronic rubrics or scoring guides for use in the evaluation of the content, users, or applications. The evaluation database 308 also may include past evaluations and/or evaluation analyses for users, content, and applications, including relative rankings, characterizations, explanations, and the like.

A survey database 309 may include information relating to one or several surveys. In some embodiments, this can include information relating to the providing of one or several surveys and/or information gathered in response to one or several surveys. The information relating to providing one or several surveys can include, for example, information comprising one or several surveys and/or one or several questions, information identifying one or several survey recipients including, for example, one or several individual recipients or one or several groups of recipients such as, for example, one or several classes or portions of one or several classes, one or several frequencies for providing surveys, or the like.

In some embodiments, the information gathered in response to the one or several surveys can include, for example, user provided answers to one or several surveys, one or several survey questions, or the like. In some embodiments, this information can be linked to the user source of the information, and in some embodiments, this information can be separated from the user source of the information.

The survey information database 309 can comprise a single database or a plurality of databases. In some embodiments, the entirety of the data contained in the survey information database 309 can be stored in a single memory such as, for example, within a single memory tier, and in some embodiments, the data contained in the survey information database 309 can be stored in multiple memories such as, for example, within multiple tiers of memory. In some embodiments, dividing the data contained in the survey information database 309 into multiple tiers of memory can allow efficient use of storage resources by placing items that are desired to be quickly accessible in lower tiers than information that is not desired to be as quickly accessible.

The survey database 309 can include information identifying the student's performance in evaluating the teacher, the course, and/or the course material, as well as identifying the student's performance in academic portions of the class. In some embodiments, the survey database 309 includes information identifying the student's performance evaluating the teacher, course, and/or the course material and does not include information relating to the student's academic performance. This data may indicate the amount of time spent by the student in completing past surveys, indicate the number of written comments, or the like.

The survey database 309 can include one or several evaluations and/or evaluation reports. In some embodiments, the evaluations and/or evaluation reports can be an aggregate of data relating to teacher performance, material performance, and/or course performance.

In some embodiments, the survey database 309 can include information relating to provided feedback relating to a teacher, a course, and/or learning materials. In some embodiments, for example, this feedback can include one or several recommendations, including, for example, one or several recommended additional and/or replacement materials, one or several material changes, one or several recommended teacher improvement resources such as, for example, papers, books, courses, training, seminars, or the like, which improvement resources can relate to management, organization, speaking, educational and/or instructional techniques, or the like.

In some embodiments, the survey database 309 can be divided into a first portion comprising first memory components and a second portion comprising second memory components. In some embodiments, the first portion can comprise relatively faster memory components and the second portion can comprise relatively slower memory components. Thus, in one embodiment, the first portion can comprise tier 0 or tier 1 memory components and the second portion can comprise tier 1 or tier 2 memory components. In some embodiments, data from the survey database 309 can be divided between the first and second portions based on whether the data is used for real-time analysis. Thus, data used for real-time analysis can be stored in the first portion and data that is not used for real-time analysis can be stored in the second portion.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content distribution network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
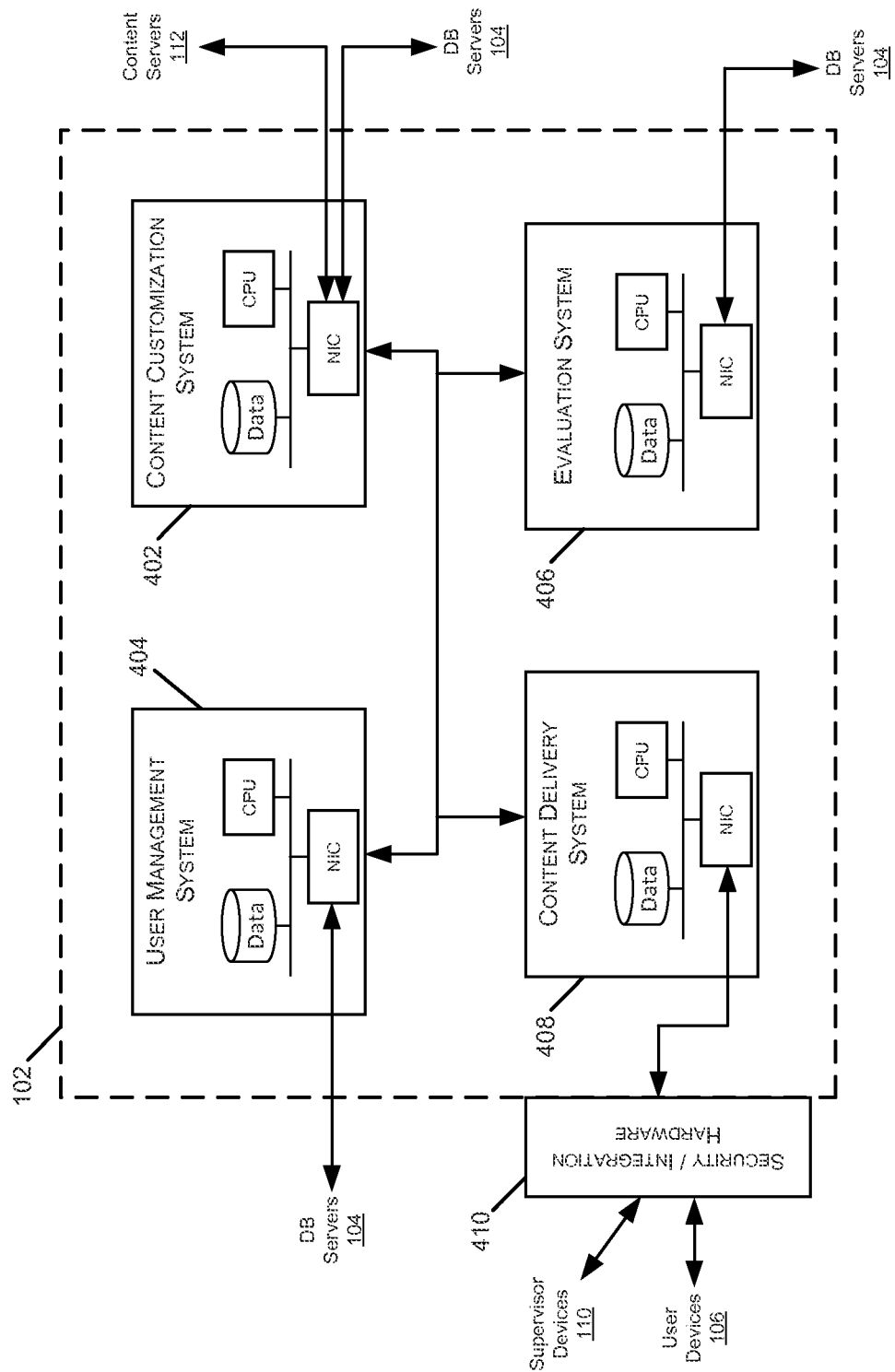
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation database 308), and the like. Based on the retrieved information from databases 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
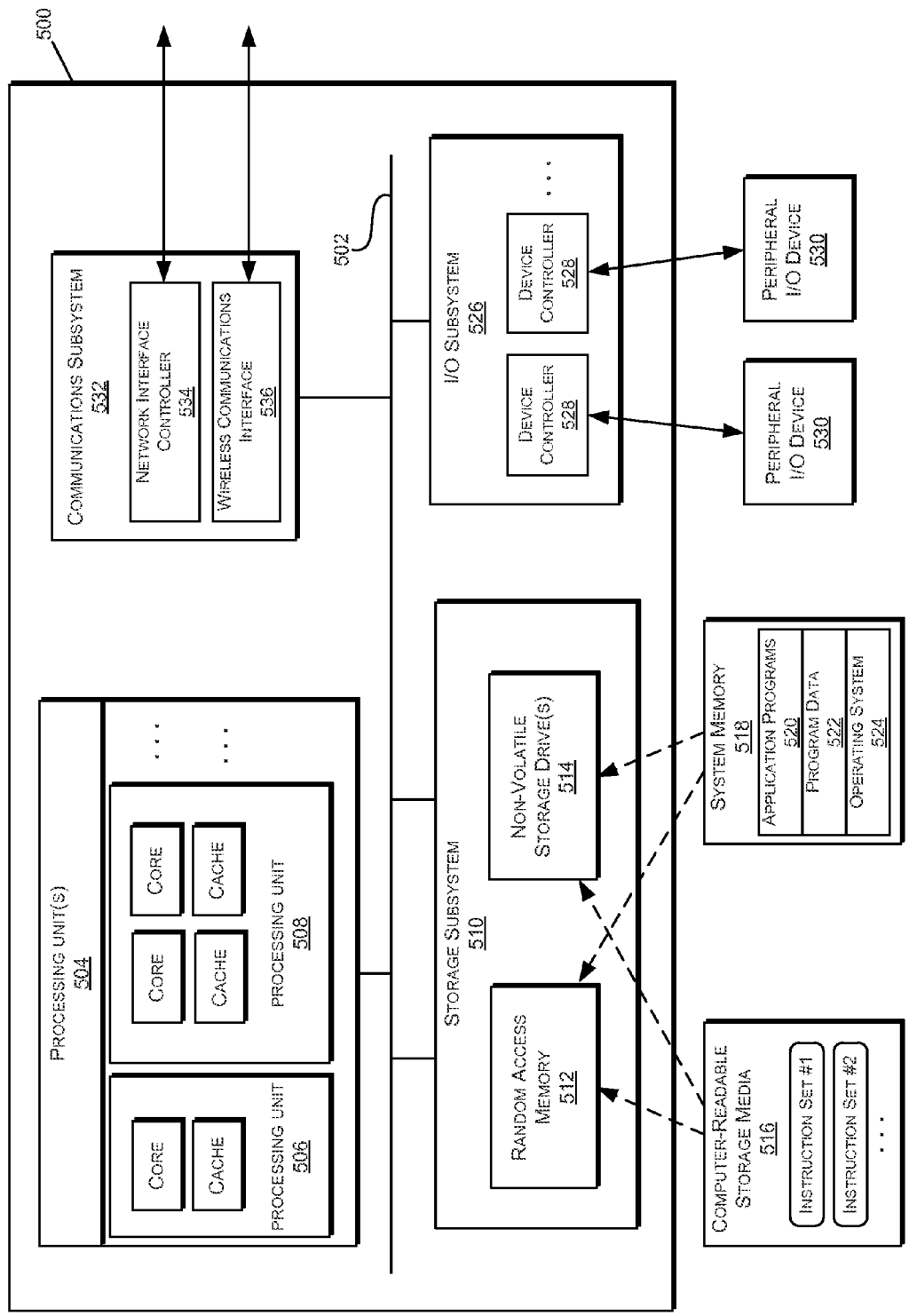
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
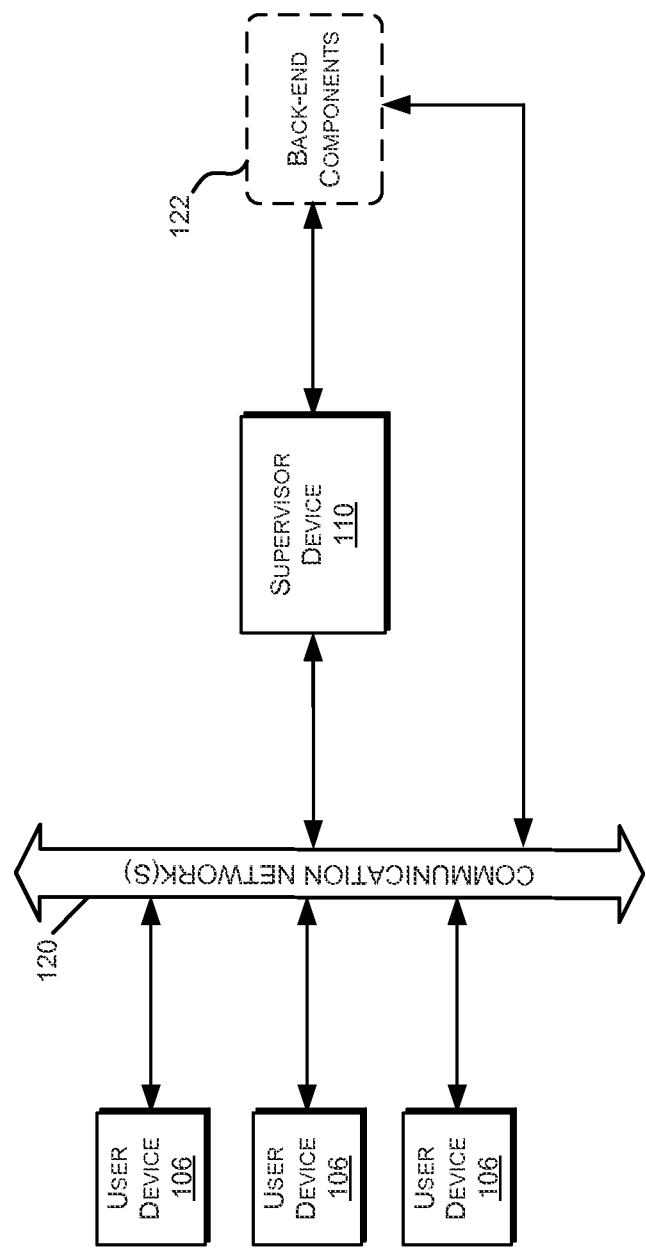
FIG. 6 is a block diagram illustrating an embodiment of the connection of user devices to a supervisor device.

With reference now to FIG. 6, a block diagram illustrating one embodiment of the connection of user devices 106 to a supervisor device 110 is shown. In some embodiments, one or several of the user devices 106 can be connected to a supervisor device 110 in a classroom environment and/or to form a virtual classroom. In embodiments in which the devices 106, 110 are connected to form a virtual classroom, the devices can be connected via, for example, a WAN, a cellular network, a telephone communication network, or the like.

In embodiments in which the devices 106, 110 are connected in a classroom environment. In such a classroom environment, the user devices 106 and the supervisor device 110 can be connected to each other via, for example, a Local Area Network (LAN). This configuration can facilitate the quick transfer of data between the devices 106, 110 and can increase the speed with which survey data can be provided to the user devices 106 and survey data can be received form the user crevices 106 and provided to the supervisor device 110. In some such embodiments, the supervisor device 110 can be further connected with the back-end components 122 and can serve as a conduit for survey data from the user devices 106 to the back-end components 122. In such an embodiment, the supervisor device 110 can receive survey data from the user devices 106, can identify some or all of the survey data for local analysis, and can provide all of the survey data or the data not identified for local analysis to the back-end components 122. The supervisor device 110 can additionally, in some embodiments, locally analyze the portion of the survey data identified for local analysis and can use the analysis of this portion of the survey data to generate and provide one or more recommendations relating to content being delivered to the users of the user devices 106.

Figure 7:
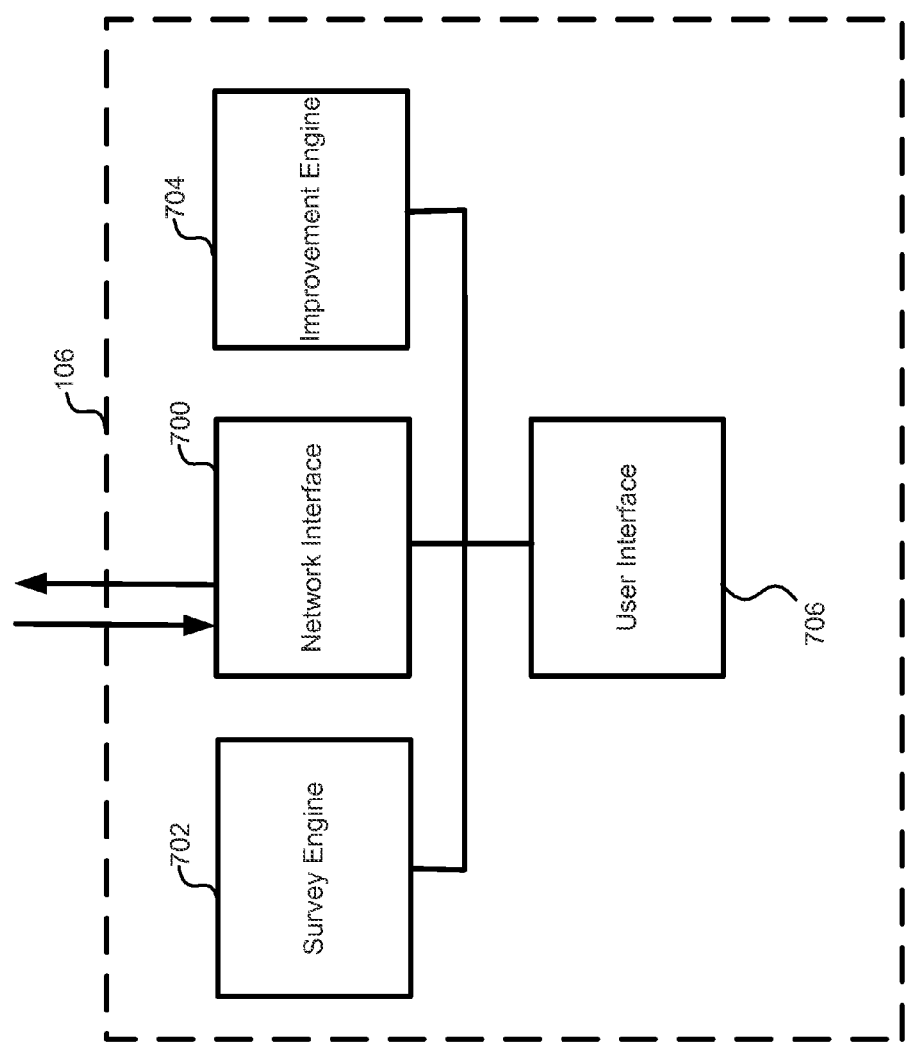
FIG. 7 is a schematic illustration of one embodiment of a user device for use with the content distribution network.

With reference now to FIG. 7, a block diagram of one embodiment of a user device 106 is shown. As discussed above, the user device 106 can be configured to provide information to and/or receive information from other components of the content distribution network 100. The user device can access the content distribution network 100 through any desired means or technology, including, for example, a webpage, a web portal, or via network 110.

As depicted in FIG. 7, the user device 106 can include a network interface 700. The network interface 700 allows the user device 106 to access the other components of the content distribution network 100, and specifically allows the user device 106 to access the communication network 120 of the content distribution network 100 either directly and/or via other devices such as, for example, the privacy server 108. The network interface 700 can include features configured to send and receive information, including, for example, an antenna, a modem, a transmitter, receiver, or any other feature that can send and receive information. The network interface 700 can communicate via telephone, cable, fiber-optic, or any other wired communication network. In some embodiments, the network interface 700 can communicate via cellular networks, WLAN networks, or any other wireless network.

The user device 106 can include a survey engine 702. The survey engine 702 can provide one or several surveys to the user, allow the generation and/or alteration of one or several surveys, allow the user to receive data relating to one or several completed surveys and/or one or several evaluations or evaluation reports, and/or store data relating to one or several surveys completed by the user.

The user device 106 can include an improvement engine 704. In some embodiments, the improvement engine 704 can be configured to receive information relating to one or several evaluations and/or evaluation reports from the evaluation engine 702 and retrieve information from the database server 104, and specifically from the survey database 309 of the database server 104, and to provide an improvement recommendation to the teacher/instructor. In some embodiments, the improvement engine 704 can further include features configured to facilitate in the completion and/or in achieving the benefit of the recommendation. In some embodiments, these features can include one or several follow-up features that can be used to determine if the teacher/instructor has acted on the recommendation The user device 106 can include a user interface 706 that communicates information to, and receives inputs from a user. The user interface 706 can include a screen, a speaker, a monitor, a keyboard, a microphone, a mouse, a touchpad, a keypad, or any other feature or features that can receive inputs from a user and provide information to a user. In some embodiments, these features of the user interface can be configured to transform a physical input such as, for example, a pressure applied to a key, a mouse, a touchpad, a touchscreen, or the like and/or a pressure wave sensed at a microphone, into an electrical signal. Additionally, in some embodiments, portions of the user interface 706 can be configured to transform one or several electrical signals into physical outputs such as, for example, converting one or several electrical signals into the selective illumination and display of data via a screen and/or the generation of one or several sound waves via a speaker.

Figure 8:
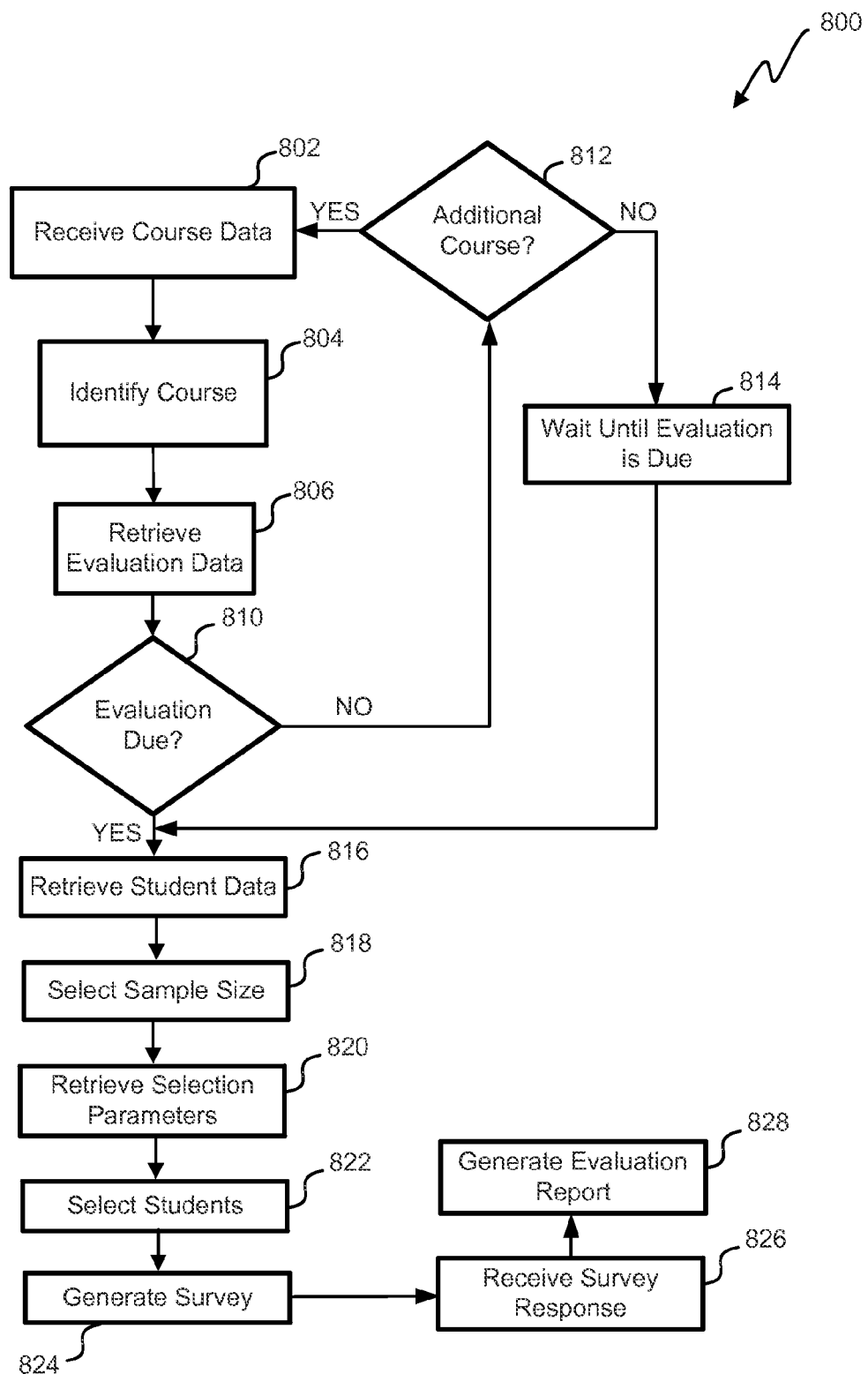
FIG. 8 is a flowchart illustrating one embodiment of a process for generating a dynamic evaluation.

With reference now to FIG. 8, a flowchart illustrating one embodiment of a process 800 for generating a dynamic evaluation is shown. In some embodiments, the process 800 can be used to identify a group for completion of one or several surveys and to generate an evaluation and/or evaluation report based on the results of those surveys. The process 800 can be performed by the content distribution network and/or a component thereof including, for example, the processor 102.

The process 800 begins at block 802 wherein course data is received. In some embodiments, the course data can include information relating to one or several courses including, for example, information relating to the start and end times for the one or several courses, the one or several teachers and/or instructors for the one or several courses, materials used in the one or several courses, or the like. In some embodiments, the course data can include information relating to when surveys and/or evaluations have been completed and/or generated and the results of the surveys and/or evaluations. In some embodiments, this information can be retrieved from the content library database 303.

After the course data has been received, the process 800 proceeds to block 804 wherein a course is identified and/or selected. In some embodiments, the course can be identified and/or selected to determine if a survey and/or evaluation is due.

After the course has been identified, the process 800 proceeds to block 806 wherein evaluation data is retrieved. In some embodiments, the evaluation data can include information relating to the frequency with which survey should be distributed and/or collected and the frequency with which an evaluation and/or evaluation report should be generated. In some embodiments, the evaluation data can be retrieved from one of the databases 104 such as, for example, the content library database 303.

After the evaluation data has been retrieved, the process 800 proceeds to decision state 810 wherein it is determined if an evaluation is due. In some embodiments, this determination can be made by the survey server 119, the supervisor device 110, and/or another component of the content distribution network 100. In some embodiments, this determination can include identifying the date of the last completed survey and/or evaluation, determining the amount of time that has passed since the date of the last completed survey and/or evaluation, and determining if an adequate amount of time has passed such that a new and/or additional survey and/or evaluation should be completed and/or generated.

If it is determined that a survey and/or evaluation should not be completed and/or generated, a first value indicative thereof is associated with the course, and the process 800 proceeds to decision state 812 wherein it is determined if there is an additional course. In some embodiments, and as mentioned above, the identified and/or selected course may be one or several courses for which the process 800 can be performed. If it is determined that there are additional courses, then the process 800 returns to block 802 and proceeds as outlined above. If it is determined there are not additional courses, then the process 800 proceeds to block 814 and waits until an evaluation is due. In some embodiments, this can include associating a trigger with the course. In some embodiments, the trigger is triggered when the amount of time has passed such that a new survey and/or evaluation is due.

After waiting until an evaluation is due, or returning again to decision state 810, if it is determined that an evaluation is due, then the process 800 proceeds to block 816 wherein student data is retrieved. In some embodiments, the student data can include data relating to some or all of the students in the course. This data can include information stored in one of the databases 104 such as, for example, the user profile database 301 and/or the survey database 309. In some embodiments, this information can relate to the student's academic history such as, for example, past academic performance outside of the course, student academic performance in the course, trends in student academic performance, student feedback performance including, for example, the value of the surveys completed by the student, and/or the like.

After the student has been retrieved, the process 800 proceeds to block 818 wherein the sample size is selected. In some embodiments, for example, the sample size for the survey and/or evaluation can be determined by the teacher and/or an administrator or manager and the sample size information can be stored in one of the databases 104 such as, for example, the content library database 303. In some embodiments, the sample size information can be retrieved.

After the sample size has been selected and/or the sample size information has been retrieved, the process 800 proceeds to block 820 wherein selection parameters are retrieved. In some embodiments, for example, the selection parameters can define criteria for including one or several students in the sample of students that will receive a survey. In some embodiments, the selection parameters can correlate information stored in the student data such as, for example, age, gender, major, learning style, or the like of the student, as well as student performance measures such as student past academic performance, student present academic performance, courses completed by the student, student survey performance, or the like.

After the selection parameters have been retrieved, the process 800 proceeds to block 822 wherein students are selected. In some embodiments, the students can be selected by comparing aspects of the student data to the selection parameters. In some embodiments, a student whose student data closely corresponds to the selection parameters may be selected for inclusion in the sample. In some embodiments, the comparison of the student data and the selection parameters can be performed by, for example, survey server 119 and/or one of the devices 106, 110.

After the students in the sample have been selected, the process 800 proceeds to block 824 wherein a survey is generated. In some embodiments, the survey can be generated from one or several preexisting questions and/or from questions created by the teacher specifically for the course and/or survey. These questions can be stored in one of the databases 104 such as, for example, the survey database 309. In some embodiments, the questions can be selected such that the survey questions relate to one or several topics such as, for example, pace including, for example, whether subject matter was presented at the right speed, too fast, or too slow, structure including, for example, the degree to which the organization of subject matter facilitated learning, technology including the degree to which technology based resources facilitated learning, and/or comprehension including the degree to which the subject matter was comprehensible and facilitated learning. In some embodiments, the generation of the survey can further include providing the survey to the one or several students in the sample. In some embodiments, the survey can be provided to one or several user devices 106 associated with one or several students in the sample.

After the survey has been generated, the process 800 proceeds to block 826 wherein a survey response is received. In some embodiments, the survey response can include one or several responses generated by the students in the sample. In some embodiments the survey response can be received by survey server 119, the supervisor device 110, and/or other component of the content distribution network 100 from the one or several user devices 106 used by the students in the sample to complete the survey.

After the survey responses have been received, the process 800 proceeds to block 828 wherein an evaluation report is generated. In some embodiments, the evaluation report can include the aggregation of data collected through the survey. The evaluation report can include one or several tools that allow the teacher and/or instructor to view the collected data and/or to view aspects of student data for students in the course. In some embodiments, the evaluation report can include an indicator of the effectiveness of one or several aspects of the course including, for example, the teacher's effectiveness, effectiveness of the learning material, and/or the overall effectiveness of the course. In some embodiments, the evaluation report can further include one or several recommendations for improving the course, improving teacher performance, and/or improving learning materials associated with the course. In some embodiments, the evaluation report can be generated by the survey server 119, by the supervisor device 110, and/or by another component of the content distribution system 100.

Figure 9:
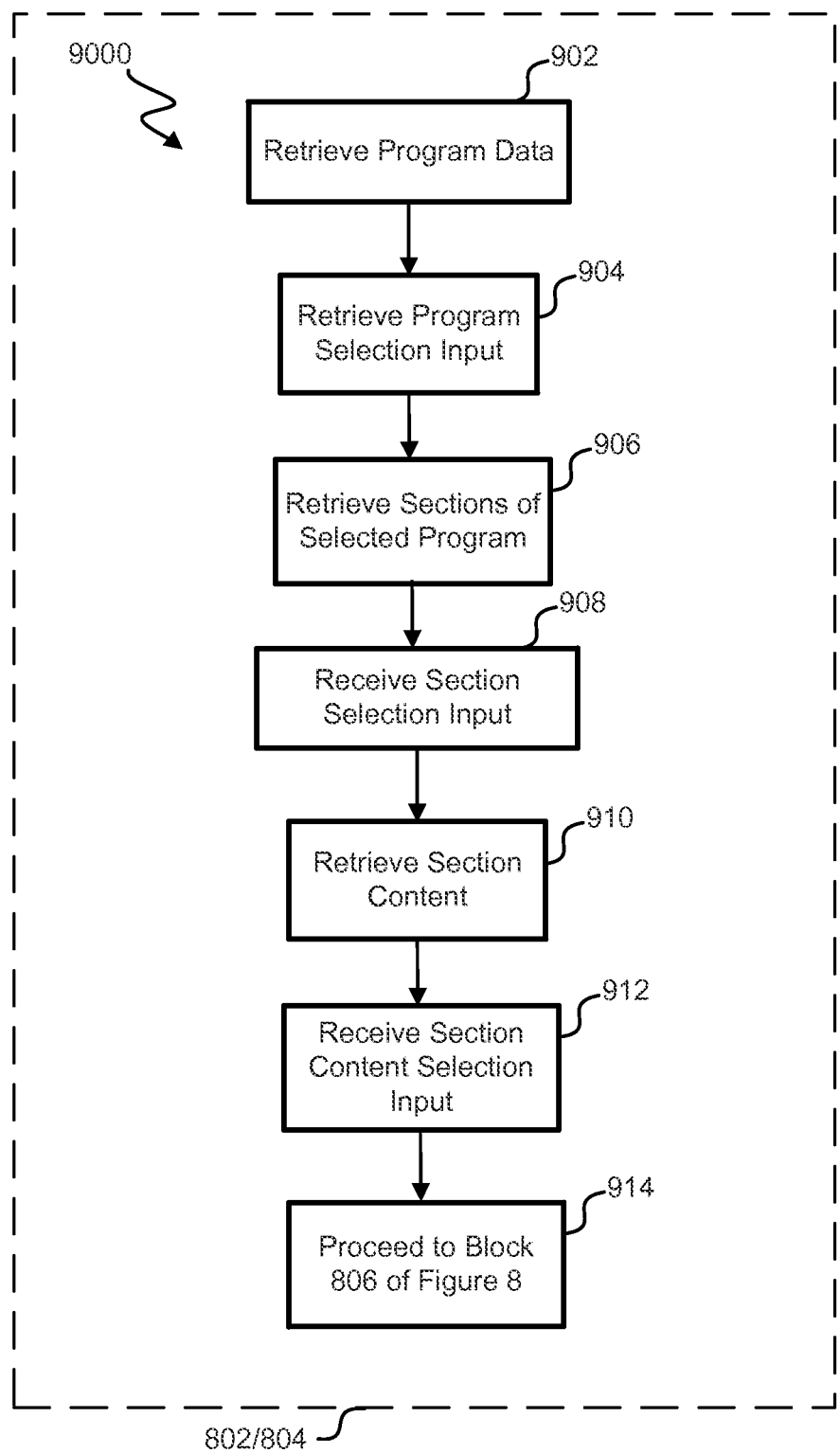
FIG. 9 is a flowchart illustrating one embodiment of a process for receiving course data and identifying a course.

With reference now to FIG. 9, a flowchart illustrating one embodiment of a process 900 for receiving course data and identifying a course is shown. In some embodiments, this process 900 can be performed in the place of, or as a part of one or both of blocks 802 and 804 of FIG. 8. The process 900 begins at block 902, wherein program data is retrieved. In some embodiments, the program data can identify one or more programs for which a survey can be given. The one or several programs can include, for example, a grouping of one or several classes, courses, lectures, seminars, or the like. The program data can be retrieved from one of the databases 104, and can specifically be retrieved from, for example, the content library database 303. In some embodiments, the program data can be stored in a memory component that is not the fastest tier of storage in the content distribution system 100.

After the program data has been retrieved, the process 900 proceeds to block 904, wherein a program selection input is received. In some embodiments, this step can include, for example, providing the program data identifying one or more programs in which the survey can be given to the user via, for example, one of the devices 106, 110. In some embodiments one or several prompts can be provided to the user with the program data. These one or several prompts can request that the user select one of the programs indicated in the program data, or perform an additional search.

In some embodiments, providing the program data to the server can include sending one or more electrical signals to the device 106, 110 that are received and transformed by the device 106, 110 into a physical manifestation of that signal, and specifically, in some embodiments, these signals can be received and used to generate one or more of a visible and audible output.

In some embodiments, and after, for example, the survey server 119 has provided the program data to one of the devices, a program selection input can be received. The program selection input can be an indication of the selection of one of the programs for receipt of a survey. The program selection input can be received from a user via one of the devices 106, 110, and can be provided to the survey server 119 via that device 106, 110.

After the program selection input has been received, the process 900 proceeds to block 906, wherein information identifying sections of the selected program are retrieved. In some embodiments, sections of the selected program refer to an educational subset of the selected program. In some embodiments, for example, the selected program can correspond to a degree granting program at a college or university, and sections of that program can correspond to a portion of the program, such as a class leading towards completion of the degree granting program.

After the information identifying the sections of the program has been retrieved, the process 900 proceeds to block 908, wherein a section selection input is received. In some embodiments, this step can include, for example, providing the information identifying the sections of the program to the user via, for example, one of the devices 106, 110. In some embodiments one or several prompts can be provided to the user with the information identifying the sections of the program. These one or several prompts can request that the user select one of the sections indicated in the information identifying the sections of the program, or perform an additional search.

In some embodiments, providing the information identifying the sections of the program to the server can include sending one or more electrical signals to the device 106, 110 that are received and transformed by the device 106, 110 into a physical manifestation of that signal, and specifically, in some embodiments, these signals can be received and used to generate one or more of a visible and audible output.

In some embodiments, and after, for example, the survey server 119 has provided the information identifying the sections of the program to one of the devices, a section selection input can be received. The section selection input can be an indication of the selection of one of the sections for receipt of a survey. The section selection input can be received from a user via one of the devices 106, 110, and can be provided to the survey server 119 via that device 106, 110.

After the section selection input has been received, the process 900 proceeds to block 910, wherein the section content is retrieved. In some embodiments, the section content can be some or all of the educational content that can be delivered during the section. The section content can be retrieved from one of the databases 104 such as, for example, the content library database 303.

After the section content has been retrieved, the process 900 proceeds to block 912, wherein the section content selection input is received. In some embodiments, this step can include, for example, providing the information identifying the section content to the user via, for example, one of the devices 106, 110. In some embodiments one or several prompts can be provided to the user with the information identifying the section content. These one or several prompts can request that the user select some or all of the content indicated in the information identifying the section content, or perform an additional search.

In some embodiments, providing the information identifying the section content to the server can include sending one or more electrical signals to the device 106, 110 that are received and transformed by the device 106, 110 into a physical manifestation of that signal, and specifically, in some embodiments, these signals can be received and used to generate one or more of a visible and audible output.

In some embodiments, and after, for example, the survey server 119 has provided the information identifying the section content to one of the devices 106, 110, a content selection input can be received. The content selection input can be an indication of the selection of some or all of the content of the section for which collection of survey data is desired. This input can be received from a user via one of the devices 106, 110, and can be provided to the survey server 119 via that device 106, 110.

After the section content selection input has been received, the process 900 proceeds to block 914, and continues with block 806 of FIG. 8.

Figure 10:
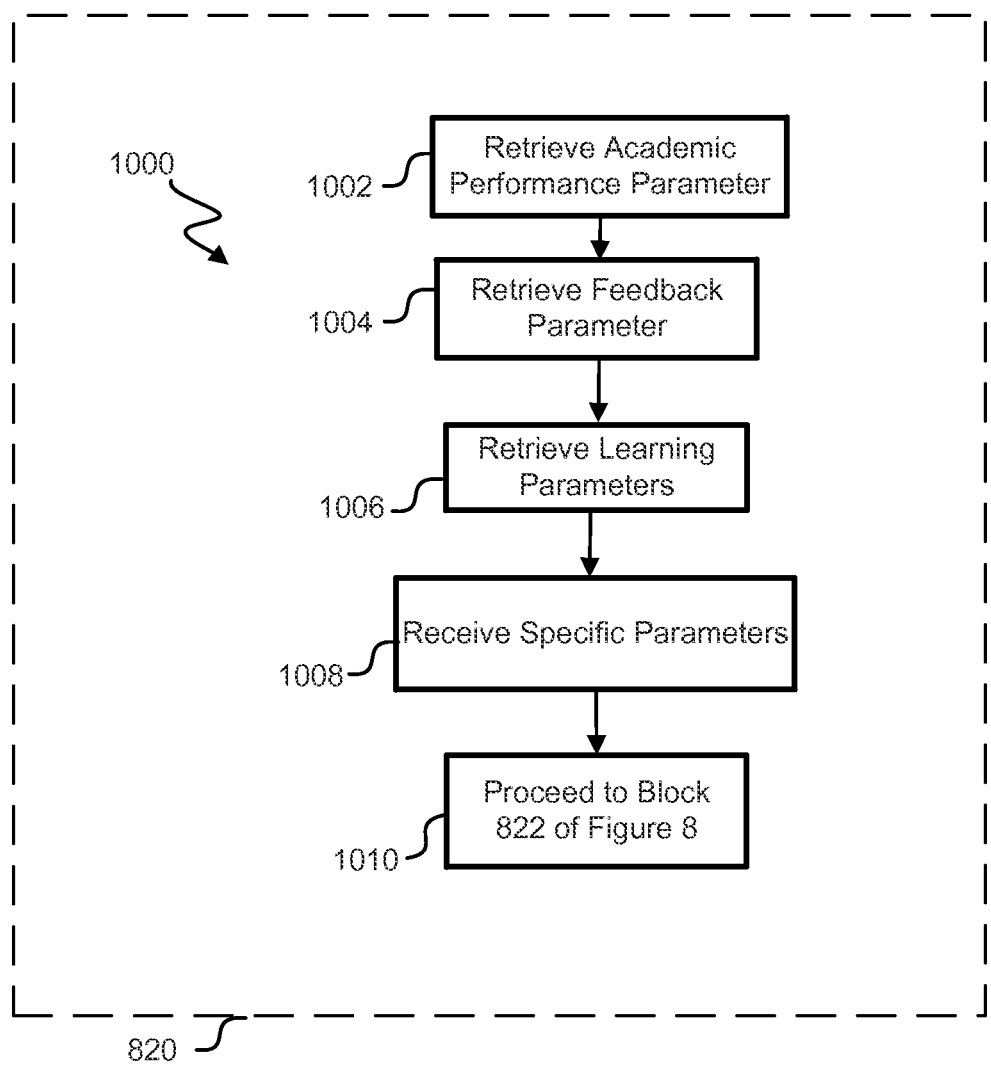
FIG. 10 is a flowchart illustrating one embodiment of a process for retrieving selection parameter.

With reference now to FIG. 10, a flowchart illustrating one embodiment of a process 1000 for retrieving selection parameters is shown. In some embodiments, the process 1000 can be performed as a sub process of the retrieving of the selection parameter shown in block 820 of FIG. 8. The process 1000 can be performed by the content distribution network 100 and/or a component thereof.

The process 1000 begins at block 1002 wherein academic performance parameter is received. In some embodiments, the academic performance parameter can be one of several selection parameters, and can be retrieved from one of the databases 104 such as, for example, the content library database 303. In some embodiments, the academic performance parameter indicates one or several levels of academic performance desired to be represented by students in the sample.

In some embodiments, for example, the academic performance parameter further includes a sub sample size for each of the levels of academic performance desired to be represented by students in the sample. In one such embodiment, for example, the academic performance parameter may specify a sample having a first number of students performing at a first academic level, a second number students performing at a second academic level, a third number of students performing at a third academic level, and a fourth number students performing at a fourth academic level. In some embodiments, the numbers of students desired for each level of academic performance can be any number including, for example, 1, 2, 3, 5, 10, 20, 50, 100, or any other or intermediate number students. In some embodiments, there can be any number of academic performance levels including, for example, 1 level, 2 levels, 3 levels, 4 levels, 5 levels, 6 levels, 10 levels, 20 levels, 50 levels, and/or any other or intermediate number of academic performance levels.

In some embodiments, the academic performance parameter can further include a weighting value and/or a weighting function. In some embodiments, the weighting value and/or weighting function can identify the importance of selection of one or several students at each of the specified one or several levels, and/or the importance and/or value of each additional student included in the sample at each of the academic performance levels.

After the academic performance parameter has been received and/or retrieved, the process 1000 proceeds to block 1004 wherein a feedback parameter is received. In some embodiments, the feedback parameter can be one of several selection parameters, and can be retrieved from one of the databases 104 such as, for example, the content library database 303. In some embodiments, the feedback parameter indicates a desired threshold level of feedback performance for inclusion of students in the sample. In some embodiments, the feedback performance can be indicative of the usefulness of information provided by the student in past surveys. In some embodiments, this can include, for example, whether the student's past surveys appear to be thoughtfully completed or hastily completed such as, for example, whether the student provided written comments, whether the student identified specific areas for improvement, whether the student feedback varied throughout past surveys and/or across different surveys, or the like.

After the feedback parameter has been retrieved, the process 1000 proceeds to block 1006 wherein learning parameters are retrieved. In some embodiments, the learning parameters can be one of several selection parameters, and can be retrieved from one of the databases 104 such as, for example, the content library database 303. The learning parameters can include information identifying one or several student learning types and indicating a desired degree of representation of the one or several learning types in the sample.

After the learning parameters have been received, the process 1000 proceeds to block 1008 wherein any specific parameters are received. In some embodiments, for example, the teacher and/or instructor may have one or several other specific parameters to be used in selecting the sample and/or admitting students to the sample. In some embodiments, these parameters can include whether the student has taken a previous course from the teacher and/or instructor, student admission to a program, major, or the like, and/or any demographic information relating to the student such as age, gender, race, disability, or the like. In some embodiments, the specific parameters can be received by the content distribution network 100 via one or several of the user devices 106. After any specific parameters have been received, the process 1000 proceeds to block 1010 and then to block 822 of FIG. 8.

Figure 11:
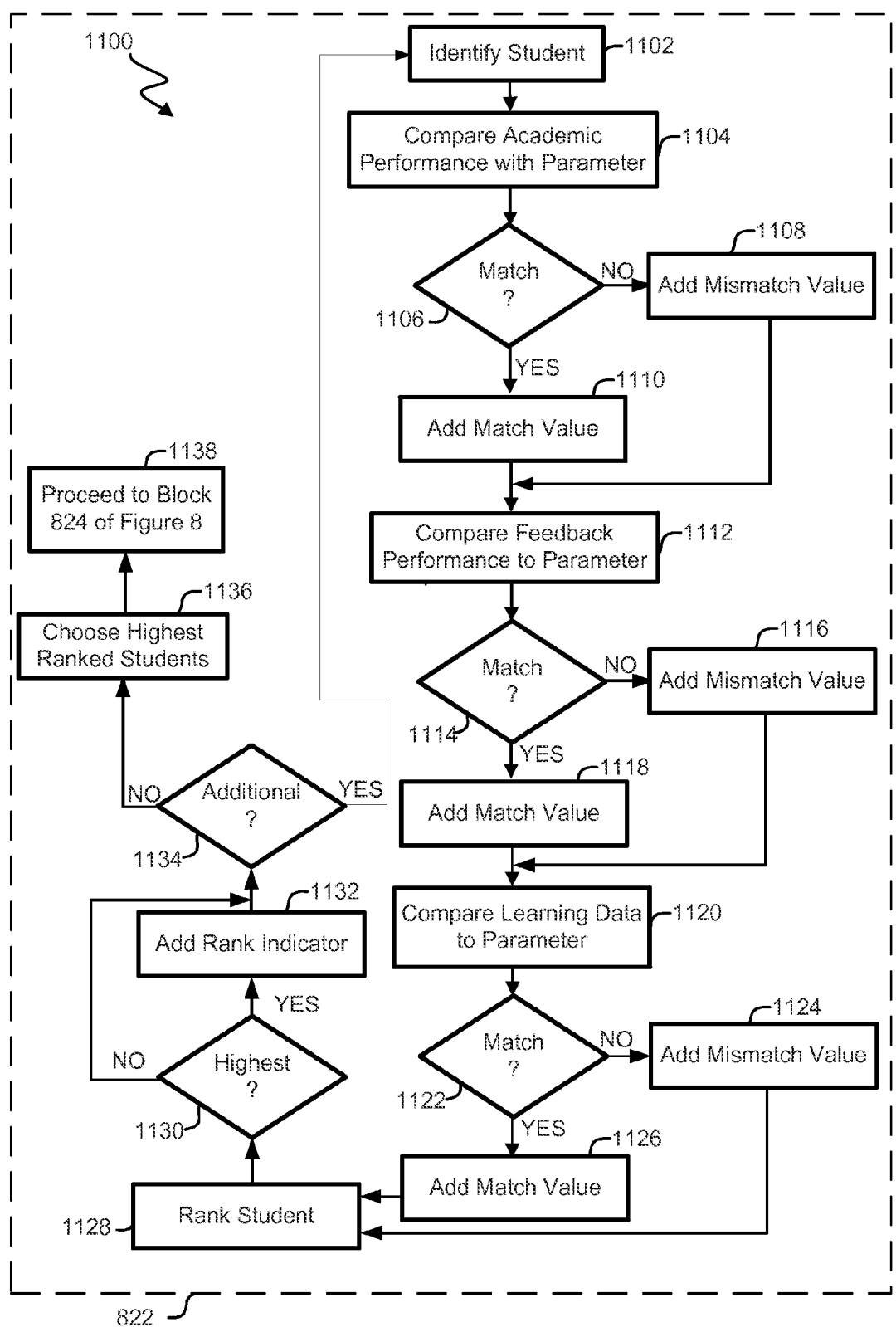
FIG. 11 is a flowchart illustrating one embodiment of a process for selecting students.

With reference now to FIG. 11, a flowchart illustrating one embodiment of a process 1100 for selecting students is shown. In some embodiments, the process 1100 can be performed as a sub process of block 822 shown in FIG. 8. The process 1100 can be performed by the content distribution network 100 and/or by a component thereof.

The process 1100 begins at block 1102 wherein a student is identified. The student can be identified using any desired technique including, for example, selecting the first and/or next student from the students in the class and/or course.

After the student has been identified, the process 1100 proceeds to block 1104 wherein the academic performance of the student is compared with the academic performance parameter. In some embodiments, this can include a comparison of pass student academic performance with aspects of the academic performance parameter relating to past student performance and/or comparison of current student academic performance including, for example, academic student performance in the current class with aspects of the academic performance parameter relating to current academic performance and/or academic performance within the current course and/or class. This comparison can be made by the survey server 119 and/or by another component of the content distribution network 100.

After the student academic performance has been compared with the academic performance parameter, the process 1100 proceeds to decision state 1106 wherein it is determined if there is a match between the student academic performance and the academic performance parameter. In some embodiments in which the academic performance parameter includes aspects relating to past academic performance as well as current academic performance, decision state 1106 can include determining the degree to which the student's academic performance corresponds with the academic performance parameter. In some embodiments in which the academic performance parameter identifies one or several levels of academic performance for inclusion in the sample, decision state 1106 can include identifying whether the student's academic performance corresponds to any of the indicated academic performance levels and identifying to which of the academic performance levels the student's academic performance corresponds.

If it is determined that the student's academic performance does not correspond to the academic performance parameter, then the process 1100 proceeds to block 1108 and a value indicative of the mismatch between the student's academic performance and the academic performance parameter is added. In some embodiments, this indicator can be added to one of the databases 104 such as, for example, the survey database 309 and/or the user profile database 301. In some embodiments, alternatively, if it is determined that the student's academic performance corresponds to the academic performance parameter, then the process 1100 proceeds to block 1110 and a value indicative of the match between the student's academic performance and the academic performance parameter is added. In some embodiments, this indicator can be added to one of the databases 104 such as, for example, the survey database 309 and/or the user profile database 301. Alternatively, in embodiments in which the degree of match between the student academic performance and/or the academic performance parameter is determined, then a value indicative of the degree of correspondence can be added to one of the databases 104 such as the user profile database 301 and/or the survey database 309.

After the value indicative of either the match of the mismatch of the student academic performance and the academic performance parameter has been added, the process 1100 proceeds to block 1112, wherein the feedback performance parameter is compared with the student's past feedback performance. In some embodiments, this comparison can be performed by the processor 102 and/or another component of the content distribution network 100 such as one or several of the user devices 106. After the student feedback performance has been compared to the feedback performance parameter, the process 1100 proceeds to decision state 1114 wherein it is determined if there is a match between the student feedback performance and the feedback performance parameter. In some embodiments, this determination can further include determining the degree of correspondence between the student feedback performance and the feedback performance parameter.

If it is determined that the student's feedback performance does not correspond to the feedback performance parameter, then the process 1100 proceeds to block 1116 and a value indicative of the mismatch between the student's feedback performance and the feedback performance parameter is added. In some embodiments, this indicator can be added to one of the databases 104 such as, for example, the survey database 309 and/or the user profile database 301. In some embodiments, alternatively, if it is determined that the student's feedback performance corresponds to the feedback performance parameter, then the process 1100 proceeds to block 1118 and a value indicative of the match between the student's feedback performance and the feedback performance parameter is added. In some embodiments, this indicator can be added to one of the databases 104 such as, for example, the survey database 309 and/or the user profile database 301. Alternatively, in embodiments in which the degree of match between the student feedback performance and/or the feedback performance parameter is determined, then a value indicative of the degree of correspondence can be added to one of the databases 104 such as the user profile database 301 and/or the survey database 309.

After the value indicative of either the match of the mismatch of the student feedback performance and the feedback performance parameter has been added, the process 1100 proceeds to block 1120, wherein the student data is compared to the learning parameters. In some embodiments, this comparison can be performed by the survey server 119 and/or by another component of the content distribution network 100 such as one or several of the user devices 106.

After the student data has been compared to the learning parameters, the process 1100 proceeds to decision state

1122, wherein it is determined if there is a match between the student data and the learning parameters. In some embodiments, this can include determining whether, and to what degree, the student's learning style(s) are desired for inclusion in the sample. In some embodiments, this determination can further include determining the degree of correspondence between the student data and the learning parameters.

If it is determined that the student data does not correspond to the learning parameter, then the process 1100 proceeds to block 1124 and a value indicative of the mismatch between the student data and the feedback performance parameter is added. In some embodiments, this indicator can be added to one of the databases 104 such as, for example, the survey database 309 and/or the user profile database 301. In some embodiments, alternatively, if it is determined that the student data corresponds to the learning parameters, then the process 1100 proceeds to block 1126 and a value indicative of the match between the student data and the learning parameters is added. In some embodiments, this indicator can be added to one of the databases 104 such as, for example, the survey database 309 and/or the user profile database 301. Alternatively, in embodiments in which the degree of match between the student data and/or the learning parameter is determined, a value indicative of the degree of correspondence can be added to one of the databases 104 such as the user profile database 301 and/or the survey database 309.

After the value indicative of either the match of the mismatch of the student data and the learning parameters has been added, the process 1100 proceeds to block 1128 wherein the student is ranked. In some embodiments, the student can be ranked according to the values indicative of match between information relating to the student and the one or several parameters and/or the degree of match between information relating to the student and the one or several parameters. In some embodiments, this ranking can include a comparison of values associated with the identified student and values associated with students for which the process 1100 has been previously performed. In some embodiments, the ranking of the student can further include evaluation of the number of surveys completed by the student and/or the recentness of surveys completed by the student. In some embodiments, for example, it may be advantageous to limit the number of surveys completed by one or several students so as to increase the likelihood of receiving accurate and thoughtful input in the surveys.

After the student has been ranked, the process 1100 proceeds to decision state 1130 wherein it is determined if the student is the highest ranked student. In some embodiments, this determination can include determining whether the student is the highest ranked student based on evaluation of the values indicative of the match and/or any weighting values associated with one or several parameters. In some embodiments, this determination of the highest ranked student can be performed for the entire course and/or subgroup of the course such as, for example, a subgroup defined by academic performance levels, by race, gender, age, a teacher, course of study, or any other parameter.

If it is determined that the student is the highest ranked student, then the process 1100 proceeds to block 1132 wherein a ranked indicator is added. In some embodiments, the ranked indicator can be added when the student is the highest ranked, and in some embodiments, the ranked indicator can be added for each student regardless of rank and/or for a portion of students having a sufficiently high and/or low ranking. In some embodiments, the adding of the rank indicator can further include the adding of a value indicative of the completion of process 1100 for the student identified in block 1102. In some embodiments, the ranked indicator can be stored in one of the database 104 such as, for example, the user profile database 301 and/or the survey database 309.

After the rank indicator has been added, or returning to decision state 1130, if it is determined that the student is not the highest ranked student, then the process 1100 proceeds to decision state 1134 wherein is determined if there are additional students for which the process 1100 should be performed. In some embodiments, this determination can include determining whether a value indicative of the completion of the process 1100 has been associated with each of the students in the course. If one or several students are not associated with a value indicative of the completion the course, then there are additional students and the process 1100 can return to block 1102 and proceeds as outlined above.

If it is determined that there are no additional students, then the process 1100 can proceed to block 1136 wherein the highest strength student and/or students are selected for the sample. In some embodiments, this can include selecting one or several groups of students according to sample size numbers indicated in the selection parameters. In some embodiments, the selection can be performed by the survey server 119 and/or a component of the content distribution network 100. After the highest rank students have been selected, the process 1100 proceeds to block 1138 and returns to block 824 of FIG. 8.

Figure 12:
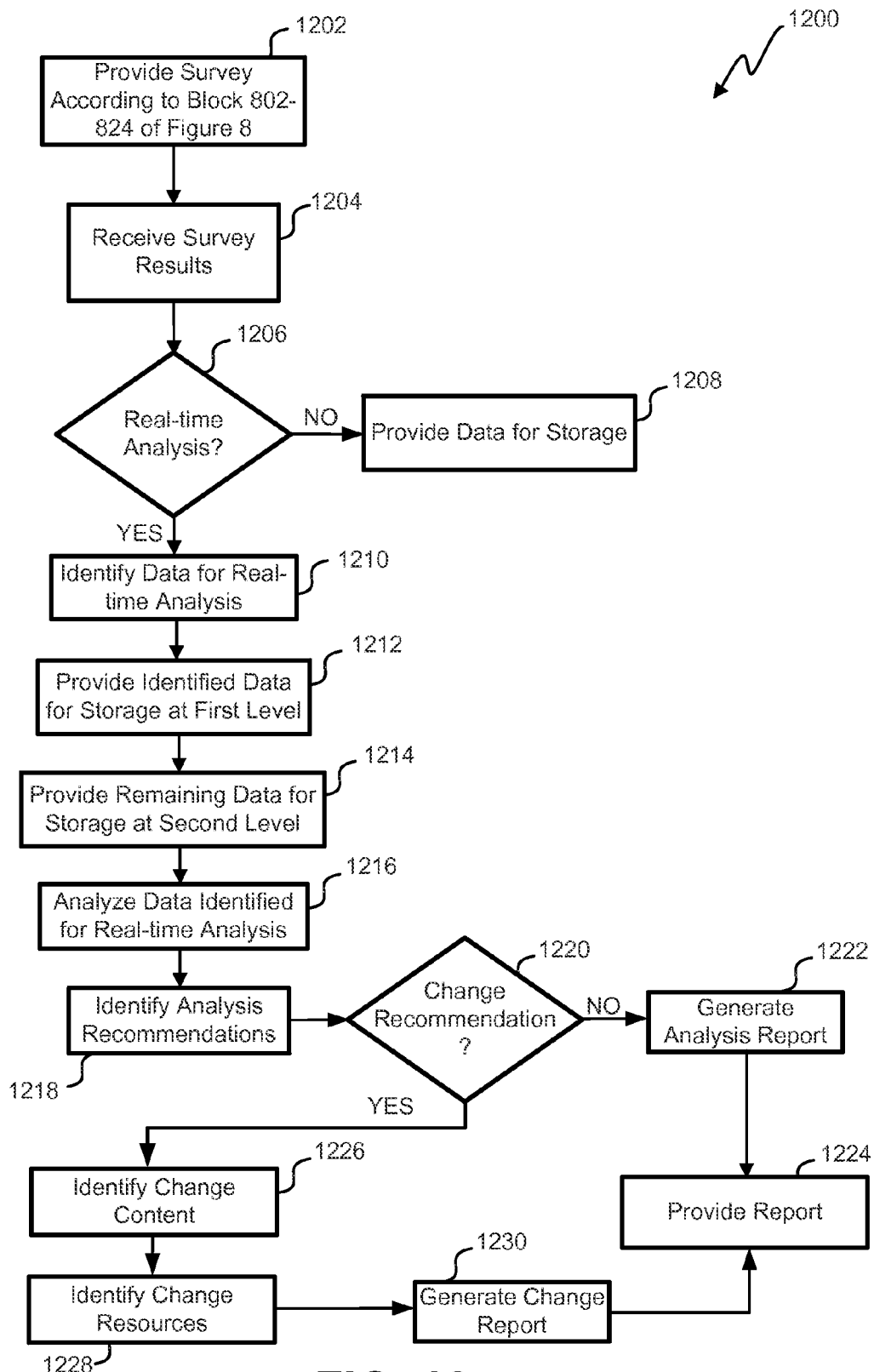
FIG. 12 is a flowchart illustrating one embodiment of a process for analysis of survey data.

With reference now to FIG. 12, a flowchart illustrating one embodiment of a process 1200 for analysis of survey data is shown. The process 1100 can be performed by the content distribution network 100 and/or by a component thereof.

The process 1200 begins at block 1202, wherein a survey is provided in accordance with the method of steps 802 to 824 of FIG. 8. After the survey has been provided, the process 1200 proceeds to block 1204, wherein survey results, also referred to herein as evaluation results, are received. In some embodiments, the survey results are received. In some embodiments, the survey results can be received from one or several of the user devices 106 by, for example, the supervisor device 110 and/or the survey server 119.

After the survey results have been received, the process 1200 proceeds to decision state 1206, wherein it is determined if the survey results will be used for real-time analysis. In some embodiments, this can include determining the type of survey data received, and/or receiving/retrieving data indicating an intended purpose for some or all of the survey data. If it is determined that none of the survey data is intended for real time analysis, then the process 1200 proceeds to block 1208, wherein the survey data is provided for storage, and in some embodiments, the survey data can be provided for storage in a selected memory tier. Thus, in some embodiments and as the survey data is not intended for use in real-time analysis, the survey data can be provided for storage in a slower-speed memory component.

Returning again to decision state 1206, if it is determined that some or all of the survey data is intended for real-time analysis, the process 1200 proceeds to block 1210, wherein the all or portions of the survey data intended for real-time analysis is identified. In some embodiments, this can include identifying one or several characteristics of types of survey data that are desired for real-time analysis, searching the received survey data for these one or several characteristics, and identifying survey data associated with these one or several characteristics as for use in real-time analysis.

After survey data for real-time analysis has been identified, the process 1200 proceeds to block 1212, wherein the identified all or portions of the survey data intended for real-time analysis are provided for storage in a first storage level, which first storage level can correspond to a first memory tier. After the data identified for real-time analysis has been provided for storage, the process 1200 proceeds to block 1214, wherein the remaining survey data is provided for storage at a second level. In some embodiments, the second level can correspond to a second memory tier that is slower than the memory tier associated with the first storage level. Thus, data that is used for real-time analysis can be prioritized to faster memory resources, and data that is not used for real-time analysis can be stored in slower memory resources.

After the remaining data has been provided for storage at the second storage level, the process 1200 proceeds to block 1216, wherein the data identified for real-time analysis is analyzed. In some embodiments, this analysis can be performed by a, for example, the supervisor device 110 and/or the survey server 119. After the data has been analyzed, the process 1200 proceeds to block 1218, wherein any analysis recommendations are identified. In some embodiments, these analysis recommendations correspond to one or several recommended changes to the section, which changes can include, for example, a change in content, in presentation style, or the like.

After any analysis recommendations have been identified, the process 1200 proceeds to decision state 1220, wherein it is determined if a change recommendation should be made. In some embodiments, this determination can include determining whether any analysis recommendations were identified. If an analysis recommendation was identified, then a determination can be made to make a change recommendation. Alternatively, if no analysis recommendation is identified, then a determination can be made to make no change recommendation.

If it is determined to make no change recommendation is made, then the process 1200 proceeds to block 1222, wherein an analysis report is generated. In some embodiments, the analysis report can contain and/or represent the aggregation of the survey data and/or any results from the analysis of the survey data. In some embodiments, the analysis report can be generated by the supervisor device 110 and/or the survey server 119, and a copy of the report can be stored in one of the databases 104. After the analysis report has been generated, the process 1200 proceeds to block 1224, wherein the report is provided to the user via, for example, one of the user devices 106 and/or the supervisor device 110.

Returning again to decision state 1220, if it is determined to make a change recommendation, then the process 1200 proceeds to block 1226, wherein any change content is identified. In some embodiments, the change content can be content recommended for inclusion in the section. This content can be retrieved from one of the databases such as, for example, the content library database 303. After any change content has been identified, the process 1200 proceeds to block 1228, wherein any change resources are identified. In some embodiments, the change resources can comprise one or several items configured to affect the section. This can include, for example, teacher training materials, teacher training classes, or the like.

After any change resources have been identified, the process 1200 proceeds to block 1230, wherein a change report is generated. The change report can contain and/or represent the aggregation of the survey data, any results from the analysis of the survey data, any identified change content, and/or any identified change resources. In some embodiments, the change report can identify a deficiency in the section and can propose a remediation for that deficiency such as, for example, changing the tempo of the section, replacing and/or supplementing content with the change content, further teacher development via the change resources, and/or the like. In some embodiments, the change report can be generated by the supervisor device 110 and/or the survey server 119, and a copy of the report can be stored in one of the databases 104. After the change report has been generated, the process 1200 proceeds to block 1224, wherein the change report is provided to the user via, for example, one of the user devices 106 and/or the supervisor device 110.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of generating an evaluation comprising:
   retrieving, by a processor of a computing device, student data from a user profile database, wherein the student data uniquely identifies each of a group of students in a course;
   retrieving, by the processor of the computing device, selection parameters, wherein the selection parameters identify a criteria for inclusion of one of the group of students in the course in a survey group, wherein the survey group is selected to complete a survey;
   comparing, by the processor of the computing device, at least one of the student data to the selection parameters;
   identifying, by the processor of the computing device, the survey group based on the comparison of the at least one of the student data to the selection parameters;
   receiving, by the processor of the computing device, survey data from the survey group;
   determining, by the processor of the computing device, attributes identified within the survey data;
   categorizing, by the processor of the computing device, the survey data according to the attributes identified within the survey data;
   selectively storing, by the processor of the computing device, portions of the survey data in a first tier or a second tier of a tiered memory according to the categorization of the survey data, wherein selectively storing portions of the survey data in the first tier or the second tier of the tiered memory comprises identifying a first portion of the survey data for use in real-time analysis and storing the first portion of the survey data for use in the real-time analysis in the first tier of the tiered memory, and wherein:
   the first tier comprises at least one of: tier 0 memory hardware or tier 1 memory hardware,
   the second tier comprises at least one of tier 1 memory hardware or tier 2 memory hardware, and
   the second tier comprises relatively slower memory hardware than the first tier;
   generating, by the processor of the computing device, an analysis recommendation from the portions of the survey data stored in the first tier of the tiered memory; and
   providing, by the processor of the computing device, a change report based on the generated analysis recommendation.

2. The method of claim 1 further comprising receiving course data from a content library database.

3. The method of claim 2, further comprising generating the survey.

4. The method of claim 3, wherein generating the survey comprises retrieving at least one question from a survey database, wherein the survey database comprises a plurality of questions and survey data received in response to the plurality of questions.

5. The method of claim 4, further comprising determining when the survey data is for use in the real-time analysis.

6. The method of claim 5, further comprising identifying a second portion of the survey data that is not for use in the real-time analysis and storing the second portion of the survey data that is not for use in the real-time analysis at the second tier.

7. The method of claim 6, wherein the first tier comprises first memory components and the second tier comprises second memory components, wherein the first memory components are relatively faster than the second memory components.

8. The method of claim 7, wherein generating the analysis recommendation comprises analyzing the first portion of the survey data for use in the real-time analysis.

9. The method of claim 8, further comprising recommending a change when the analysis recommendation is identified and not recommending a change when the analysis recommendation is not identified.

10. The method of claim 9, further comprising providing the change report when a change is recommended and generating and providing an analysis report when a change is not recommended.

11. The method of claim 1 further comprising:
   retrieving academic performance information from the user profile database, wherein the academic performance information identifies the academic performance of the group of students in the course;
   retrieving learning information from the user profile database, wherein the learning information identifies one or several learning styles for some of the group of students in the course; and
   retrieving feedback performance information, wherein the feedback performance information indicates a usefulness of surveys previously completed by the group of students in the course.

12. A system for generating evaluation data, the system comprising:
   a tiered memory comprising hardware forming:
      a first tier, wherein the first tier comprises at least one of: tier 0 memory hardware or tier 1 memory hardware; and
      a second tier, wherein the second tier comprises at least one of tier 1 memory hardware or tier 2 memory hardware, wherein the second tier comprises relatively slower memory hardware than the first tier;
a database stored in the tiered memory, the database comprising:
  a survey database comprising a first portion located on the first tier, and a second portion located on the second tier, wherein the first portion comprises data received in response to a survey and wherein the second portion comprises data used in creating the survey;
  a user profile database comprising student data relating to a student's academic history, one or several learning styles, and current enrollment, wherein the user profile database is located on the second tier; and
a processor configured to:
  retrieve student data for a group of students from the user profile database, wherein the student data uniquely identifies each of a group of students in a course;
  retrieve selection parameters, wherein the selection parameters identify a criteria for inclusion of one of the group of students in the course in a survey group, wherein the survey group is selected to complete a survey;
  compare at least one of the student data to the selection parameters;
  identify the survey group based on the comparison of the at least one of the student data to the selection parameters;
  receive survey data from the survey group;
  determining attributes identified within the survey data;
  categorize survey data according to the attributes identified within the survey data;
  selectively store portions of the survey data in the first tier of the tiered memory or the second tier of the tiered memory according to categorization of the survey data, wherein selectively storing portions of the survey data comprises identifying the first portion of the survey data for use in real-time analysis and storing the first portion of the survey data for use in the real-time analysis at the first tier; and
  generate an analysis recommendation from the portions of the survey data stored in the first tier of the tiered memory; and provide a change report based on the generated analysis recommendation.

13. The system of claim 12, wherein the processor is further configured to receive course data from a content library database.

14. The system of claim 13, wherein the processor is configured to generate the survey, wherein generating the survey comprises retrieving at least one question from the survey database.

15. The system of claim 14, wherein selectively storing portions of the survey data in the first tier of the tiered memory or the second tier of the tiered memory according to categorization of the survey data comprises identifying portions of the survey data used in the real-time analysis.

16. The system of claim 15, wherein the processor is further configured to identify the second portion of the survey data that is not for use in the real-time analysis and store the second portion of the survey data that is not for use in the real-time analysis at the second tier.

17. The system of claim 16, wherein generating the analysis recommendation comprises analyzing the first portion of the survey data for use in the real-time analysis.

18. The system of claim 17, wherein the processor is further configured to recommend a change when the analysis recommendation is identified and not recommend a change when the analysis recommendation is not identified.

19. The system of claim 17, wherein the processor is further configured to provide the change report when a change is recommended and generate and provide an analysis report when a change is not recommended.

20. The system of claim 12, wherein the processor is further configured to:
  retrieve academic performance information from the user profile database, wherein the academic performance information identifies the academic performance of the group of students in the course;
  retrieve learning information from the user profile database, wherein the learning information identifies one or several learning styles for some of the group of students in the course; and
  retrieve feedback performance information, wherein the feedback performance information indicates a usefulness of surveys previously completed by the group of students in the course.

* * * * *